(12) United States Patent
Huang

(10) Patent No.: US 7,424,156 B2
(45) Date of Patent: Sep. 9, 2008

(54) RECOGNITION METHOD AND THE SAME SYSTEM OF INGEGRATING VOCAL INPUT AND HANDWRITING INPUT

(75) Inventor: Chao-Shih Huang, Taipei Hsien (TW)

(73) Assignee: Acer Incorporated, Tapei Hsien (TW)

( * ) Notice: Subject to any disclaimer, the term of this patent is extended or adjusted under 35 U.S.C. 154(b) by 606 days.

(21) Appl. No.: 10/642,195

(22) Filed: Aug. 18, 2003

(65) Prior Publication Data
US 2004/0223646 A1      Nov. 11, 2004

(30) Foreign Application Priority Data
May 8, 2003      (TW) ............................... 92112571 A

(51) Int. Cl.
*G06K 9/00* (2006.01)
(52) U.S. Cl. ....................... 382/187; 382/179; 382/189; 704/246
(58) Field of Classification Search ................. 382/187, 382/189, 179, 257, 229, 177, 311, 202, 161, 382/309, 100, 103, 303, 304, 310; 178/19.01, 178/18.01; 345/179; 341/22; 715/541; 704/246
See application file for complete search history.

(56) References Cited

U.S. PATENT DOCUMENTS

| | | | |
|---|---|---|---|
| 5,692,097 A | * | 11/1997 | Yamada et al. ............... 704/241 |
| 5,982,929 A | * | 11/1999 | Ilan et al. ..................... 382/200 |
| 6,226,403 B1 | | 5/2001 | Parthasarathy ............... 382/187 |
| 6,275,611 B1 | * | 8/2001 | Parthasarathy ............... 382/187 |
| 6,285,785 B1 | * | 9/2001 | Bellegarda et al. ........... 382/187 |
| 6,425,256 B1 | * | 7/2002 | Bushnell et al. ............... 62/262 |
| 6,438,523 B1 | * | 8/2002 | Oberteuffer et al. ......... 704/270 |
| 6,535,853 B1 | * | 3/2003 | Reitano ...................... 704/271 |
| 6,539,113 B1 | * | 3/2003 | Van Kleeck ................. 382/185 |

FOREIGN PATENT DOCUMENTS

TW      283774      1/1984

OTHER PUBLICATIONS

English Language Abstract of TAI. 283774.

* cited by examiner

*Primary Examiner*—Sheela C Chawan
(74) *Attorney, Agent, or Firm*—Pillsbury Winthrop Shaw Pittman LLP

(57) ABSTRACT

The present invention relates to a recognition method integrating vocal input and handwriting input. After receiving a vocal input of an object alphanumeric symbol, the system will recognize the input vocal signal and generate a alphanumeric symbol array having a plurality of candidate alphanumeric symbols corresponding to the object alphanumeric symbol, then receiving an input handwriting signal describing the feature of the object alphanumeric symbol and extracting the most coincidental candidate alphanumeric symbol from the alphanumeric symbol array on according to the feature. The object of the present invention is integrating the vocal input and handwriting input effectively, and promoting the recognition rate.

20 Claims, 6 Drawing Sheets

| 風 | 蜂 | 封 | 豐 | 瘋 | ... |
|---|---|---|---|---|---|
| 逢 | 縫 | 馮 | 夆 | 渢 | ... |
| 唪 | 覂 | — | — | — | — |

RECOGNITION METHOD AND THE SAME SYSTEM OF INGEGRATING VOCAL INPUT AND HANDWRITING INPUT

The present application claims priority to Taiwan application No. 092112571 entitled "A recognition method and the same system of integrating vocal input and handwriting input" filed on May 8, 2003.

BACKGROUND OF THE INVENTION

1. Field of the Invention

The present invention relates to a recognition method and the same system, especially relates to a recognition method and the same system integrating vocal input and handwriting input.

2. Related Art

Up to now the communication method between human and machine is almost proceeded by means of key board、 mouse、 handwriting、 vocal input、 image, etc. Especially the handwriting and vocal input method is widely researched and developed for the familiarity of human being's communication model. However, the result of the above associate researches and developments fail to be applied to business application for the failure of promoting the recognition ability as well as the input efficiency.

In the field of developing vocal input and handwriting input recognition technology, a lot of associate technologies have been disclosed on various technical documents, taking the vocal input recognition as an example, U.S. Pat. No. 5,692,097 discloses a method of recognizing character by means of syllable, and Taiwan Publish No.283744 also discloses an intellectual Mandarin syllabic input method. On the other hand, taking the handwriting input recognition as an example, U.S. Pat. No. 6,226,403 discloses a character recognition method by a plurality of input characters, and U.S. Pat. No. 6,275,611 also discloses a method decomposing the input character、 classifying the substructure and recognizing the substructure. By the above prior arts, it shows the vocal recognition technology and the handwriting recognition technology make great progress separately.

However, all of the above technologies are dedicated to the improvement of algorithm、 feature extracting of handwriting/vocal input、 or building standard toward improvement of vocal/handwriting patterns. The above efforts only make little promotion toward the recognition rate. Therefore, a concept of integrating handwriting and vocal input to promote the recognition rate was proposed in the present invention.

U.S. Pat. No. 6,285,785 discloses a message recognition employing integrated speech and handwriting information. The present invention refers this patent as a prior art. This patent provides a method to give each word a different vocal or handwriting weight($\alpha,\beta$), for example, if for the purpose of making a word be recognized by vocal input easier, then the vocal weight $\alpha$ may be set higher and handwriting weight $\beta$ may be set lower. On the contrary, if for the purpose of making a word be recognized by handwriting input easier, then the vocal weight $\alpha$ may be set lower than the weight $\beta$.

When user wants to process the recognition of input message, the user can obtain two lists comprising a plurality of possible candidate alphanumeric symbols by vocal input and handwriting input, and then combine the two lists into a new list according to the weight($\alpha,\beta$), and determine a most similar alphanumeric symbol to promote the recognition rate effectively.

Although the above method can effectively promote the recognition ability, it still exists many problems. First, because this recognition method needs to input complete vocal and handwriting data for each character in advance, so the recognition procedure becomes extreme complex and difficult. Second, especially for Oriental language such Chinese、 Korean、 or Japanese' not only the issue of complexity for complete handwriting input, but also existing the characteristic of one alphanumeric symbol having one syllable, so the occasions of one alphanumeric symbol corresponding to many different pronunciations or one pronunciation corresponding to many different alphanumeric symbols always happen. The above constrains make this prior art be improper for Oriental Language input system.

SUMMARY OF THE INVENTION

Therefore, the object of the present invention is providing a recognition method and the same system suitable for oriental syllabic language and integrating vocal input as well as handwriting input to promote recognition effectively.

In a preferred embodiment, the recognition system of the present invention integrating vocal input and handwriting input comprises a vocal input device、 a handwriting input device、 a vocal input similarity estimator、 and a handwriting input similarity estimator.

The vocal input device is used for receiving a vocal input having at least one logogram and converting the vocal input into a first signal. The handwriting device is used for receiving a handwriting input describing one portion of the object logogram, and converting the handwriting input into a second signal. A vocal similarity estimator is used for generating an logogram array having a plurality of candidate logograms corresponding to the object logogram according to the first signal. A handwriting similarity estimator is used for extracting the most coincidental candidate logogram from the logogram array according to the second signal. The portion of the object logogram is the radical of the object logogram.

Based on the above structure, the method of the present invention integrates vocal input recognition and handwriting input recognition comprising the steps of: First, receiving a syllabic vocal input signal of one object logogram; Second, recognizing the input vocal signal and generating an logogram array having a plurality of candidate logograms corresponding to the object logogram, then receiving an handwriting input signal describing the portion of the object logogram; finally, extracting the most coincidental candidate logogram from the logogram array according to the portion.

Therefore, the present invention takes advantage of complement between vocal input and vocal input, especially by a complete vocal input of an logogram a part of handwriting input including radical structure. By this way, the present invention provides more sufficient information for characteristic recognition, and therefore promotes recognition rate effectively.

The examples and illustrations embodying the present invention will be manifested by the descriptions of the following preferred embodiment in reference to the drawings attached therewith.

For the further description, first of all, the present invention is designed for the language which each character only corresponds to one syllable, such as Chinese、 Korean、 Japanese, etc. This embodiment takes Chinese as example for further description, but it should not be constrained by this embodiment.

DETAIL DESCRIPTION OF THE INVENTION

Figure 1:
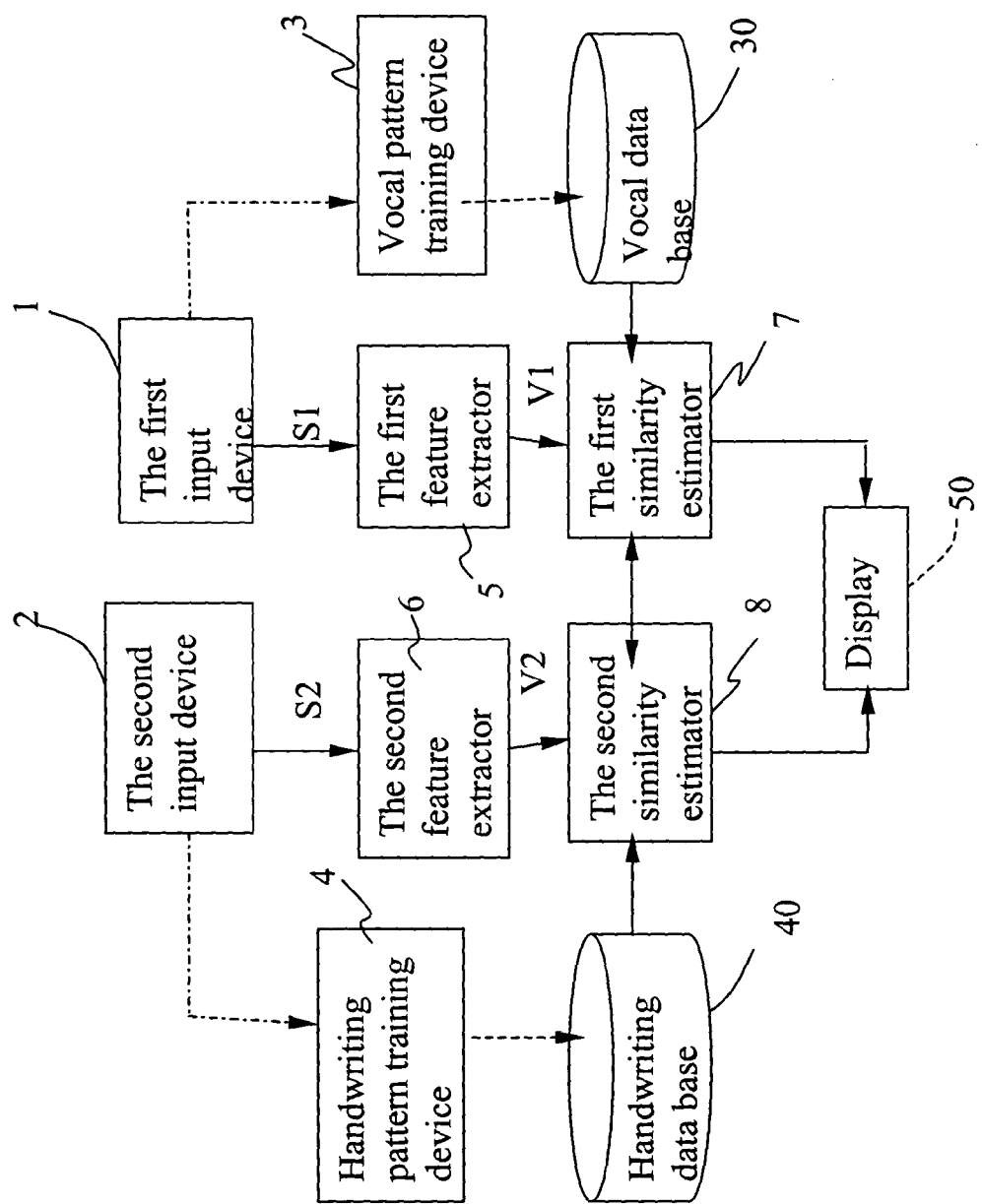
FIG. 1 is an illustration of a recognition system of integrating vocal input and handwriting input.

Refer to FIG. 1, in the preferred embodiment, the recognition system of the present invention integrates vocal input and handwriting input comprising a first input device 1, a second input device 2, a vocal pattern training device 3, a handwriting pattern training device 4, a first portion extractor 5, a second portion exactor 6, a vocal-input similarity estimator 7, and a handwriting-input similarity estimator 8.

The first input device 1 is a vocal input apparatus, for example, it comprises a microphone or a transducer, and an AD converter (does not show in the FIG. 1) connecting with the microphone, for receiving the vocal input from the user and convert the vocal input signal into a digital signal as the first signal S1. Of course, the vocal input signal can be sampled by predefining different frequencies, or proceed the input signal by means of FFT for the successive recognition steps.

The second input device 2 is a handwriting input apparatus. For example, a touch panel or a pen panel can be used for writing by stylus or by hand. Of course, the second input device 2 also having an AD converter (does not show in the FIG. 1) for sampling the handwriting structure and converting it into the second signal S2, for processing the successive recognition steps.

Wherein the second signal S2 is a substructure rather than a complete handwriting input of one logogram. Because the general handwriting input device is designed to provide user for inputting in a predetermined time span, if user does not continue handwriting inputting during the time span then the handwriting motion will be considered completed. Therefore the second signal S2 means a stroke inputted during a predetermined time span. The stroke might be only a substructure, or a radical, or the overall of one logogram.

Vocal pattern training device 3 is used for recognizing the first signal S1 transmitted by the first input device 1 according to hidden Markov model technology, and building up personal vocal pattern. With respect to the further description of hidden Markov model, it has been disclosed in the associate prior arts such as U.S. Pat. No. 6,285,785 or Taiwan Publish No.308666.

Handwriting pattern training device 4 is used for recognizing the second signal S2 transmitted by the second input device 2, and building up personal vocal pattern. With respect to the building up method of the handwriting pattern, it is processed by utilizing the pattern recognition technology, it has been disclosed in the associate prior arts such as U.S. Pat. No. 5,982,929.

Besides, the present invention further comprises a vocal database 30 and a handwriting database 40. The vocal database 30 stores a plurality of vocal patterns, associate Chinese vocabulary/phrases, and Chinese grammar rules, etc. For the convenience of processing the following recognition steps, the data of vocal database 30 is represented as FIG. 4 (top-down [fon], [fon /], [fon V], [fon \] separately), determined by the same pronunciation and usage rate. In other word, each logogram array is constructed by many candidate logograms having the same pronunciation, and the position of the candidate logogram represent the usage rate, the position more left, the usage rate more frequent. On the other hand, the data of handwriting database is sorted by strokes of the object logogram and radical of the object logogram. With respect to the method of building up associate database by radical or strokes of the logogram has been disclosed in the associate prior arts such as U.S. Pat. No. 6,539,113.

Therefore, arrowhead of dotted line in FIG. 1 shows the data flow direction under the training mode of the present invention. If the first input device 1 and the second input device 2 are utilized for input, then according to the first signal S1 and the second signal S2, vocal pattern training device 3 and handwriting pattern training device 4 build up personal vocal and handwriting pattern by utilizing the data stored in vocal database 30 and handwriting database 40, and then stores the personal voice data and handwriting data into vocal database 30 and handwriting database 40 separately, for accelerating the recognition procedure and promoting the recognition rate.

Because the first portion extractor 5 connects with the first input device 1, so the first portion extractor 5 receives the first signal S1 and extracts the first input vector V1 from the first signal S1. The method of extracting the first input vector VI is, for example, sampling the amplitude change of a certain frequency range, to obtain a plurality of portion vector that belong to different frequency ranges. In the same way, the second portion extractor 6 connects with the second input device 2, so the second portion extractor 6 receives the second signal S2 and extracts the second input vector V2 from the second signal S2, and generates a plurality of portion vector V2.

The first similarity estimator 7 connects with vocal database 30 and the first portion extractor 5. The second similarity estimator 8 connects with handwriting database 40 and the second portion extractor 6. According to the vocal pattern of vocal database 30, the first similarity estimator 7 extracts possible logogram array or logogram from the vocal database 30 by the first signal S1. Owing to building up the vocal pattern, user can effectively bypass the valueless data by saving the search time of the first similarity estimator 7 toward the vocal database 30.

In the same way, the second similarity estimator 8 extracts possible logogram array or logogram from the handwriting database 40 by the second signal S2. Besides, the first similarity estimator 7 and the second similarity estimator 8 connect each other, therefore, for example, when the first similarity estimator 7 determines a logogram array from vocal database 30 according to the vocal input of user, according to the handwriting input, the second similarity estimator 8 can also assign a coincidental logogram from the logogram array determined by the first similarity estimator 7.

Finally, the candidate logogram determined by the first similarity estimator 7 and the second similarity estimator 8 transmitted to the application program, such as Microsoft Word, and shown on display 50. Of course, except the first input device 1 and the second input device 2, the functions of the other devices are compiled by programming codes, executed by computer. The data for use is build in vocal database 30 and handwriting database 40 in advance.

Figure 2:
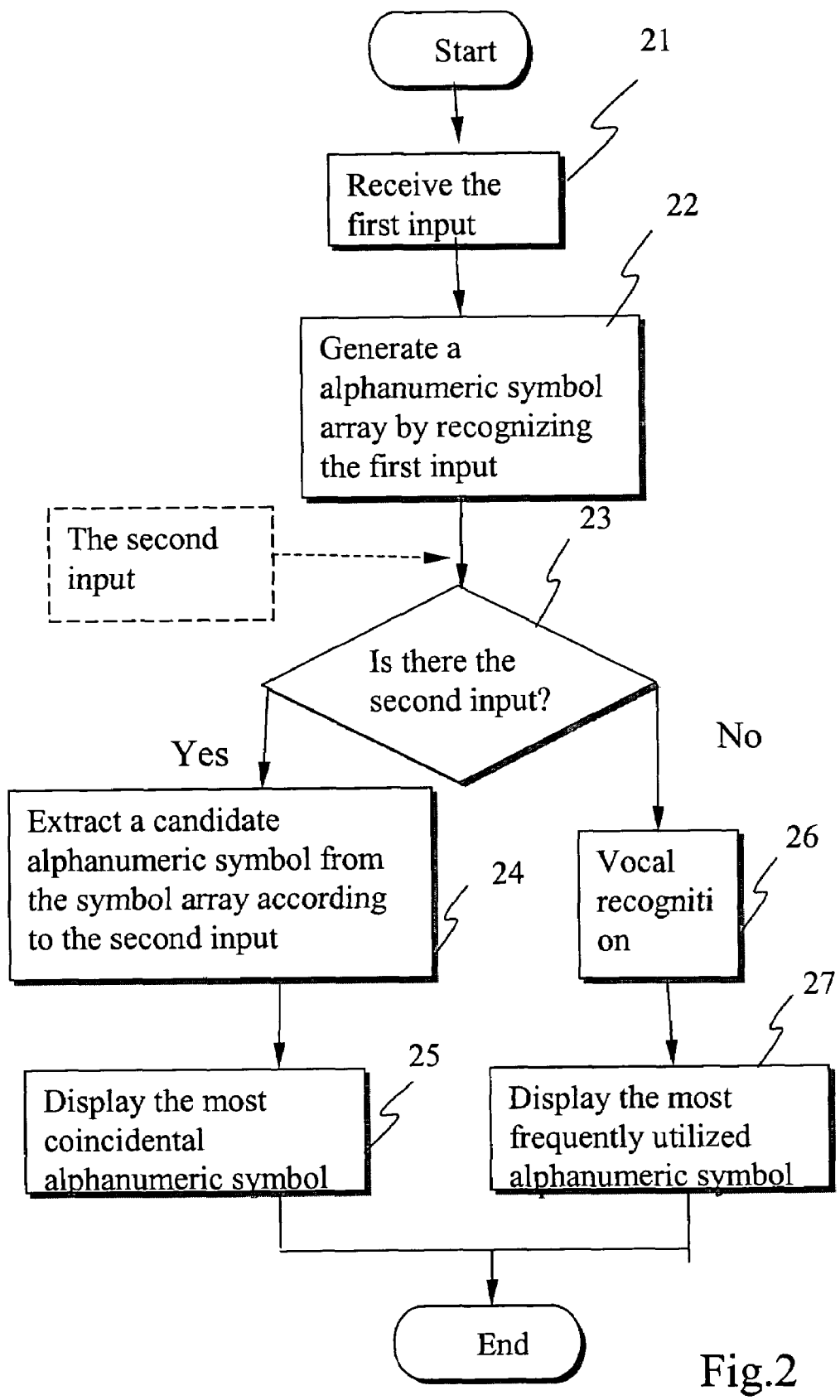
FIG. 2 is a flow diagram for describing the steps of the present invention integrating vocal input and handwriting input.

Therefore, base on the above structure and as shown on FIG. 2, the present invention of the recognition method integrating vocal and handwriting input is shown as step 21 and 22, first, receiving a first input. The first input device 1 is utilized to receive the vocal input and convert it to the first signal S1. For example, if user wants to input a word as FIG. 5, he can do a vocal input by pronouncing [fon /] as the first input. The first input can be recognized by the first portion extractor 5 and the first similarity estimator 7, and then extract the corresponding data from the vocal database 30 to generate a logogram array coinciding with the first input. The extracted logogram array in this example is shown as FIG. 4, the candidate logograms of the logogram array are sorted according to the usage rate.

As step 23 shows, a time span can be predetermined on the basis of user's predefinition or default value of program, such as 2 seconds, and the system detect whether the second input exists or not during the predetermined time span.

Figures 4, 5:
FIG. 4 is an illustration of a vocal database building up logogram array by the same pronunciation.
FIG. 5 is an illustration of tracing the radical of an object logogram by handwriting input.

During this time span, if the user utilizes the second input device 2 for inputting the portion presenting the characteristic of FIG. 5, then as step 24 shows, extracting one recognition character corresponding to the second input from the logogram array. In this embodiment, the inputted portion of the logogram represents the radical of the logogram. Therefore, as FIG. 5 shows, user may input the radical of the logogram (shown at left side as filled type).

Figure 6:
FIG. 6 is an illustration of tracing the substructure of an object logogram by handwriting input.

After extracting the logogram array corresponding to the pronunciation [fon /] by the first similarity estimator 7, and then utilizing the pattern recognition technology of the second similarity estimator 8 to search the logogram with similar shape or radical from above logogram array. By this procedure, it is obvious to know that the logogram of FIG. 5 with radical at the left side of FIG. 5 is the most coincidental logogram matching the limitation of the second input. As step 25 shows, the most coincidental logogram represented as FIG. 5 will be shown on display 50. Of course, for representing the handwriting portion of logogram as FIG. 5, user may only handwriting input a part of radical such as the left side filled shape shown on FIG. 6, or only handwriting input a part of the logogram distinguishing from the other candidate logogram, in this way, the system can also process the pattern recognition and extract the object logogram.

Figure 7:
FIG. 7 is an illustration of tracing the radical of the other different object logogram by handwriting input.

In the same way, another example is represented that the user wants to input a word as FIG. 7. If user do a vocal input [fen \], then the system will generate a logogram array including candidate logograms corresponding to the vocal input, and user only have to do a handwriting input such as the radical (shown at upper side as filled type) of the character of FIG. 7, then as FIG. 7 shows, the character of FIG. 7 will be extracted from the logogram array by pattern recognition technology.

Figure 8:
FIG. 8 is an illustration of tracing the radical of another different object logogram by handwriting input.

The other example is, when the user wants to input a word as FIG. 8, first, if user do a vocal input [pau \], then the candidate logograms will be sorted according to usage rate and listed. As FIG. 8 shows, if user handwriting input a radical (shown at left side as filled type), then the logogram of FIG. 8 including the radical will be selected by the second similarity estimator 8. Of course, if user do a handwriting input such as the other different radical, then the different logogram including the different radical will be selected. From the above examples, it can be clearly understood that the present invention effectively utilizes both the vocal and handwriting characteristic of Chinese. It is convenient for user to do only vocal input and a part of handwriting input then can recognize and input the character.

On the other hand, as step 26, 27 shows, if there is not the second input, then the present invention will be merely a vocal recognition apparatus, it will extract the most frequently utilized character according to vocal input [fon /] as well as the usage rate. Of course, in this situation, the recognition rate will not be promoted, unless the input logogram happens to be the most frequently utilized character.

Figure 3:
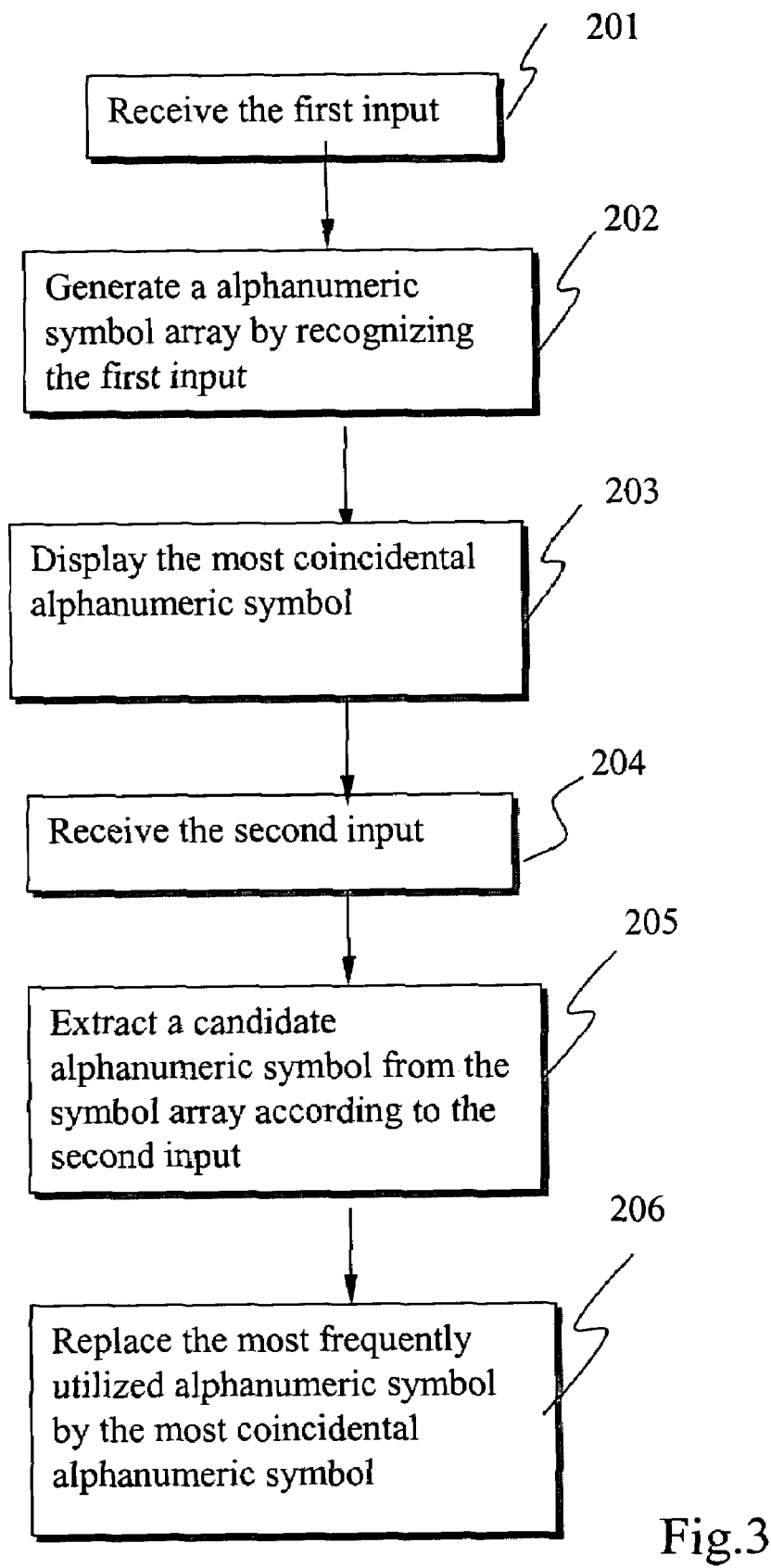
FIG. 3 is a flow diagram for describing the steps of the present invention integrating vocal input and handwriting input.

Besides, refer to FIG. 3, the present invention can also be represented as step 201~203, if user does vocal input [fon /], then the most frequently utilized candidate logogram (the logogram of FIG. 5 without the left side radical part) will be shown on the display 50. If user finds that the input object is an logogram as FIG. 5 rather than the most frequently utilized candidate logogram, then user can process the second input (a radical shown at left side as filled type of FIG. 5) in a predetermined time span. As step 204, 205 shows, the present invention will extract the logogram as FIG. 5 from the logogram array corresponding to the second input, and as step 206 shows, replace the most frequently utilized candidate logogram by logogram with a radical characteristic.

On the basis of the characteristic of Chinese, even a plurality of logograms correspond to the same pronunciation, the discrimination between the logograms is quite obvious, taking Chinese character on FIG. 4 for example, the radical and handwriting style for each logogram is quite different.

Therefore, by the complement between vocal input and handwriting input, user can easily and effectively promote the recognition rate by the combination of vocal input of an logogram and radical part of handwriting input, rather than completely handwriting input each complex logogram. Therefore, the present invention makes the input and recognition more efficient.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A method of integrating vocal input recognition and handwriting input recognition comprising:
   receiving a vocal signal representing an object logogram;
   recognizing the input vocal signal and generating a logogram array having a plurality of candidate logograms corresponding to the object logogram;
   displaying the logogram array;
   receiving an input handwriting signal representing a portion of the object logogram; and
   extracting a most coincidental candidate logogram from the array of logograms corresponding to the portion.

2. The method of claim 1 wherein the handwriting signal is a substructure of the object logogram.

3. The method of claim 2 wherein the substructure of the object logogram is the radical of the object logogram.

4. The method of claim 1, further comprising displaying most frequently utilized candidate logograms of the logogram array before receiving the input handwriting signal.

5. The method of claim 4, further comprising replacing the most frequently utilized candidate logograms with the most coincidental candidate logogram of the logogram array.

6. A method of integrating vocal input recognition and handwriting input recognition comprising:

receiving a first input representing an object logogram;

generating an logogram array having a plurality of candidate logograms corresponding to the first input;

displaying the logogram array;

detecting if there exists a second input resenting a portion of the object logogram during a predetermined time span; and if there exists the second input, then extracting a most coincidental candidate logogram from the plurality of candidate logogram based on the portion represented by the second input, wherein the first input is one of a vocal input and a handwriting input, and the second input is the other of the vocal input and the handwriting input.

7. The method of claim 6 further comprising receiving the first input and then converting the first input into a first signal and receiving the second input and then converting the second input into a second signal.

8. The method of claim 6 further comprising extracting a portion of the first input from the first signal; and extracting the portion of the second input from the second signal.

9. The method of claim 6 further comprising extracting a most frequently utilized candidate logogram from the logogram array where the second input does not exist.

10. The method of claim 9 further comprising displaying the most frequently utilized candidate logogram.

11. The method of claim 6 further comprises displaying a candidate logogram in accordance with the logogram.

12. A recognition system integrating vocal and handwriting input recognition comprising:
    a vocal input device for receiving a vocal input representing an object logogram and converting the vocal input into a first signal;
    a handwriting input device for receiving a handwriting input representing a portion of the object logogram and convert the handwriting input into a second input;
    a vocal similarity estimator for generating an logogram array having a plurality of candidate logograms corresponding to the object logogram according to the first signal;
    a display for displaying the plurality of candidate logograms; and
    a handwriting similarity estimator for extracting a most coincidental candidate logogram from the plurality of candidate logograms.

13. The recognition system of claim 12 wherein the portion of the object logogram is a radical of the object logogram.

14. The recognition system of claim 12 further comprising a vocal database storing a plurality of vocal patterns, the vocal patterns being provided for the vocal similarity estimator to map with the first signal and to generate the logogram array.

15. The recognition system of claim 12 further comprising a vocal portion extractor for extracting the characteristic of the vocal input from the first signal and transmitting the characteristic to the vocal similarity estimator.

16. The recognition system of clam 12 further comprising a handwriting database storing a plurality of handwriting patterns, the handwriting patterns being provided for the handwriting similarity estimator to map with the second signal and to extract the most coincidental candidate logogram.

17. A recognition system comprising:
    a first input device for receiving a vocal input representing a logogram and converting the vocal input into a first signal;
    a second input device for receiving a handwriting input representing a portion of the object logogram and converting the handwriting input into a second signal;
    a first similarity estimator for generating an logogram array having a plurality of candidate logograms corresponding to the object logogram by the first signal;
    a display for displaying logogram array, wherein the logograms in the logogram array are displayed in an order according to individual frequent usage rates of the plurality of candidate logograms;
    a second similarity estimator for extracting a most coincidental candidate logogram from the logogram array according to the second signal.

18. The recognition system of claim 17 further comprising a vocal database for storing a plurality of vocal patterns, and a handwriting database for storing a plurality of handwriting patterns; one of the vocal database and the handwriting database is provided for the first similarity estimator to map with the first signal and to generate the logogram array, the other of the vocal database and the handwriting database is provided for the second similarity estimator to map with the second signal and to extract the most coincidental candidate logogram.

19. The recognition system of claim 17 further comprising a first portion extractor and a second portion extractor, the first portion extractor extracting a portion of the first input from the first signal and transmitting the portion of the first input to the first similarity estimator, the second portion extractor extracting the portion of the second input from the second signal and transmitting the portion of the second input to the second similarity estimator.

20. A computer accessible recording medium comprising a plurality of programming codes for executing the following:
    receiving a input vocal signal representing an object logogram;
    recognizing the input vocal signal and generating a logogram array having a plurality of candidate logograms corresponding to the object logograms;
    displaying the plurality of candidate logograms;
    receiving an input handwriting signal representing a portion of the object logogram;
    extracting a most coincidental candidate logogram from the logogram array corresponding to the portion of the object logogram.

* * * * *

UNITED STATES PATENT AND TRADEMARK OFFICE
CERTIFICATE OF CORRECTION

PATENT NO. : 7,424,156 B2
APPLICATION NO. : 10/642195
DATED : September 9, 2008
INVENTOR(S) : Chao-Shih Huang It is certified that error appears in the above-identified patent and that said Letters Patent is hereby corrected as shown below:

On title page, item 54 Title
replace "INGEGRATING"
with --INTEGRATING--.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,424,156 B2 |
| APPLICATION NO. | : 10/642195 |
| DATED | : September 9, 2008 |
| INVENTOR(S) | : Chao-Shih Huang |

It is certified that error appears in the above-identified patent and that said Letters Patent is hereby corrected as shown below:

On title page, item 54 and Column 1, line 2, Title
replace "INGEGRATING"
with --INTEGRATING--.

This certificate supersedes the Certificate of Correction issued November 18, 2008.

Signed and Sealed this

Ninth Day of December, 2008

JON W. DUDAS
*Director of the United States Patent and Trademark Office*